US012331558B2

(12) United States Patent
Vayssiere et al.

(10) Patent No.: US 12,331,558 B2
(45) Date of Patent: Jun. 17, 2025

(54) AIRCRAFT DOOR WITH AN ANTI-VIBRATION DEVICE

(71) Applicants: AIRBUS HELICOPTERS DEUTSCHLAND GMBH, Donauworth (DE); AIRBUS HELICOPTERS, Marignane (FR)

(72) Inventors: Aurelien Vayssiere, Niederschoenenfeld Gt Feldheim (DE); Pierre Arnould, Salon de Provence (FR); Pierre Fruitet, Pompignan (FR); Alexandre Facompre, Orgon (FR)

(73) Assignees: AIRBUS HELICOPTERS DEUTSCHLAND GMBH, Donauworth (DE); AIRBUS HELICOPTERS, Marignane (FR)

( * ) Notice: Subject to any disclaimer, the term of this patent is extended or adjusted under 35 U.S.C. 154(b) by 24 days.

(21) Appl. No.: 18/121,119

(22) Filed: Mar. 14, 2023

(65) Prior Publication Data
US 2024/0035314 A1    Feb. 1, 2024

(30) Foreign Application Priority Data
Jul. 29, 2022    (EP) .................................... 22400007

(51) Int. Cl.
E05B 77/38    (2014.01)
B64C 1/14    (2006.01)
B64C 27/04    (2006.01)

(52) U.S. Cl.
CPC ............ *E05B 77/38* (2013.01); *B64C 1/1407* (2013.01); *B64C 27/04* (2013.01)

(58) Field of Classification Search
CPC ............ B64C 1/1407; B64C 2027/005; B64C 27/001; B64C 1/1461; E05B 77/36
See application file for complete search history.

(56) References Cited

U.S. PATENT DOCUMENTS 3,604,765 A    9/1971  Babcock
5,031,863 A *  7/1991  Noble ................... B64C 1/1407
                                                    D12/345

(Continued)

FOREIGN PATENT DOCUMENTS

EP    0585516 A2    3/1994
EP    0935556 A1    8/1999

(Continued)

OTHER PUBLICATIONS

European Search Report for European Application No. EP 22400007. 5, Completed by the European Patent Office, Dated Jan. 5, 2023, 7 pages.

*Primary Examiner* — Joshua J Michener
*Assistant Examiner* — Cindi M Curry
(74) *Attorney, Agent, or Firm* — BROOKS KUSHMAN P.C.

(57) ABSTRACT

An aircraft door with an inner door space; a door opening system arranged at least partly in the inner door space. The door opening system comprises: at least one locking device for locking the aircraft door in a locked state, actuation kinematics for actuating the at least one locking device, and at least one transmission rod coupling the actuation kinematics with the at least one locking device; wherein the at least one transmission rod is displaceable in the inner door space by means of the actuation kinematics for actuating the at least one locking device; and an anti-vibration device mounted in the inner door space to the at least one transmission rod for absorbing vibrations of the at least one transmission rod, wherein the anti-vibration device is displaceable in the inner door space together with the at least one transmission rod.

18 Claims, 3 Drawing Sheets

(56) References Cited

U.S. PATENT DOCUMENTS

| | | | | |
|---|---|---|---|---|
| 5,547,174 | A | 8/1996 | Bade et al. | |
| 5,826,824 | A * | 10/1998 | Martin | B64C 1/32 |
| | | | | 49/141 |
| 8,499,653 | B1 * | 8/2013 | Sheahan, Jr. | F16H 25/20 |
| | | | | 74/424.78 |
| 10,240,373 | B2 * | 3/2019 | Amante | E05C 9/046 |
| 11,420,605 | B2 * | 8/2022 | Boehm | B60T 13/745 |
| 12,049,294 | B2 * | 7/2024 | Capron | B64C 1/1423 |
| 2009/0108133 | A1 * | 4/2009 | Clausen | B64C 1/1407 |
| | | | | 244/129.1 |
| 2015/0167373 | A1 * | 6/2015 | Delbos | F16H 25/20 |
| | | | | 74/89.23 |
| 2016/0083071 | A1 * | 3/2016 | Pichlmaier | B64C 1/1423 |
| | | | | 92/76 |
| 2017/0267327 | A1 * | 9/2017 | Herau | F16D 63/006 |
| 2018/0134366 | A1 | 5/2018 | Merkel et al. | |
| 2019/0135447 | A1 * | 5/2019 | John | B64D 29/08 |
| 2019/0136585 | A1 | 5/2019 | Brittain et al. | |
| 2020/0018096 | A1 * | 1/2020 | Dyer | B64C 1/1461 |
| 2022/0003031 | A1 * | 1/2022 | Capron | B64C 1/1423 |
| 2024/0035314 | A1 * | 2/2024 | Vayssiere | F16F 7/116 |

FOREIGN PATENT DOCUMENTS

| | | | |
|---|---|---|---|
| EP | 2439135 | B1 | 12/2012 |
| EP | 3555490 | A | 10/2019 |
| KR | 100456948 | B1 | 11/2004 |
| KR | 1020160100596 | A | 8/2016 |
| KR | 101669426 | B1 | 10/2016 |
| WO | 9819908 | A1 | 5/1998 |
| WO | 2018109474 | A1 | 6/2018 |

\* cited by examiner

AIRCRAFT DOOR WITH AN ANTI-VIBRATION DEVICE

CROSS-REFERENCE TO RELATED APPLICATIONS

This application claims priority to European patent application No. 22400007.5 filed Jul. 29, 2022, the disclosure of which is incorporated in its entirety by reference herein.

TECHNICAL FIELD

The disclosure is related to an aircraft door with an inner door space and a door opening system arranged at least partly in the inner door space. The present disclosure is further related to an aircraft having such an aircraft door.

BACKGROUND

In general, doors separate environments and provide access to the environments that they separate. When such doors are used in aircrafts, they usually fulfill the following major functions: they close the aircrafts in operation, they contribute to carrying flight loads in corresponding cargo compartments and allow access to these cargo compartments, they allow passengers and crew to enter and exit the aircrafts, and they allow external access to engine compartments.

The most commonly used aircraft doors are sliding doors or hinged doors. Sliding doors are typically opened and closed in a translational, sliding motion, while hinged doors are opened and closed in a pivotal motion around an axis defined by one or more hinges.

For example, the document EP 2 439 135 B1 describes a hinged door for an aircraft, in particular for a helicopter. This hinged door has an inner door space and a door opening system arranged at least partly in the inner door space. The door opening system comprises two locking devices for locking the hinged door in a locked state, actuation kinematics for actuating the two locking devices, and at least one transmission rod coupling the actuation kinematics with at least one of the two locking devices. The at least one transmission rod is displaceable in the inner door space by means of the actuation kinematics for actuating the at least one of the two locking devices.

However, when displacing the at least one transmission rod in the inner door space for actuating the at least one of the two locking devices in order to lock the hinged door in the locked state on the helicopter, the actuation kinematics and, more particularly, the at least one transmission rod may vibrate such that a perceivable noise may be generated, i.e., a vibration noise. Vibration of the at least one transmission rod together with generation of vibration noise may occur during different phases of flight or even on ground due to vibrations and frequencies generated by the helicopter. In any case, perception of vibration noise emanated by the at least one transmission rod may lead to a feeling of poor quality of the hinged door.

Besides this state-of-the-art, the document EP 0 585 516 A2 describes provision of an intermediate bearing mounted to a bodywork of a motor vehicle as support of a respective drive shaft to reduce operational noise. Similar support bearings are described in the documents KR 101 669 426 B1 and KR 10-2016-0100596. Other support bearings are described in the documents EP 3 555 490 A1 and U.S. Pat. No. 3,604,765. However, none of these documents is related to an aircraft door and a reduction of vibration noise resulting from vibration of one or more transmission rods provided in such an aircraft door. The documents EP0935556 or WO9819908, US2018134366, KR100456948, US2019136585 and KR101669426 were cited.

SUMMARY

It is, therefore, an object of the present disclosure to provide a new aircraft door having one or more transmission rods which are inhibited from emanating vibration noise. This object is solved by an aircraft door having the features of claim 1.

More specifically, according to the present disclosure such an aircraft door comprises a frame structure, a door opening system, and an anti-vibration device. The frame structure connects a first door skin with a second door skin. Furthermore, the frame structure, the first door skin, and the second door skin form an inner door space. The door opening system is arranged at least partly in the inner door space and comprises at least one locking device for locking the aircraft door in a locked state, actuation kinematics for actuating the at least one locking device, and at least one transmission rod coupling the actuation kinematics with the at least one locking device. The at least one transmission rod is displaceable in the inner door space by means of the actuation kinematics for actuating the at least one locking device. The anti-vibration device is mounted in the inner door space to the at least one transmission rod for absorbing vibrations of the at least one transmission rod. Furthermore, the anti-vibration device is displaceable in the inner door space together with the at least one transmission rod.

Advantageously, the anti-vibration device enables at least on ground a reduction of noise perceived during door closing and in flight of noise resulting from vibration of the one or more transmission rods. The anti-vibration device is simple and cost-efficient and may have reliable visual means. It may be used on internal and external direct locking means of door systems, such as doors or cowlings, integrated or not to the locker.

The anti-vibration device advantageously comprises a simple design with common parts for any type of aircraft door having a similar underlying concept such that the anti-vibration device may be used in any type of aircraft, but also other motor vehicles. More specifically, the anti-vibration device is designed as an additional component provided for installation in a given aircraft door on a transmission rod. This additional component may comprise an outer ring supported by a curved link for amortizing displacement of the transmission rod as well as amortizing contact with neighbouring surfaces of the aircraft door's structure. Thereby, the outer ring reduces the degree of freedom of the transmission rod at least significantly.

Advantageously, the material may have selected characteristics which are suitable to enable absorption of displacement of the transmission rod and/or modification of an associated resonance frequency of the transmission rod. For instance, the material may comprise an elastomeric material or equivalent, such as silicone, rubber, polyurethane, etc.

More particularly, the associated resonance frequency of the transmission rod is preferably modified such that it differs from respective aircraft frequencies. In other words, a respective frequency width of the transmission rod is preferably always different from the aircraft's one. Thus, by modifying the associated resonance frequency of the transmission rod, any vibrations of the transmission rod may be avoided.

In summary, provision of the anti-vibration device in the aircraft door allows to reduce by absorption all extra vibration and, thus, enables at least a significant reduction of perceivable vibration noise. Integration of the anti-vibration device into a given aircraft door does not require any structural modification of the given aircraft door and is, consequently, suitable to avoid performance of time- and cost-consuming anti-vibration measures. In fact, integration of the anti-vibration device into a given aircraft door represents only a minor change that will not result in complementary kinematics and certification analyses, as it is not impacting the movement, the number of movable parts, functional interfaces and others in the aircraft door.

According to some aspects, the anti-vibration device is configured to reduce a degree of freedom in vibrational motion of the at least one transmission rod in the inner door space.

According to some aspects, the anti-vibration device is configured to modify an associated resonance frequency of the at least one transmission rod.

Preferably, the anti-vibration device comprises a predetermined Shore hardness adapted to amortize the associated resonance frequency.

The anti-vibration device may comprise an elastomeric material, preferably one of silicone elastomer, rubber elastomer, or polyurethane elastomer.

Preferably, the anti-vibration device comprises an outer ring and an inner ring, wherein the outer ring is connected to the inner ring via a curved link, and wherein the inner ring is rigidly attached to the at least one transmission rod.

The curved link may comprise at least three curved connecting arms connecting the outer ring with the inner ring.

The outer ring may be adapted for abutment against the frame structure, the first door skin, and/or the second door skin in vibrational motion of the at least one transmission rod at least for reducing the vibrational motion.

The curved link may be elastically deformable.

Preferably, the anti-vibration device further comprises a mounting interface, wherein the mounting interface is rigidly attached to the at least one transmission rod.

The mounting interface may be rigidly attached to the at least one transmission rod at a predetermined longitudinal position dependent on an intended resonance frequency of the at least one transmission rod.

If desired, the mounting interface may comprise a bushing.

The inner ring may be rigidly attached to, or integrally formed with, the mounting interface.

According to some aspects, the anti-vibration device is exchangeable.

The present disclosure further provides an aircraft with an aircraft door as described above.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
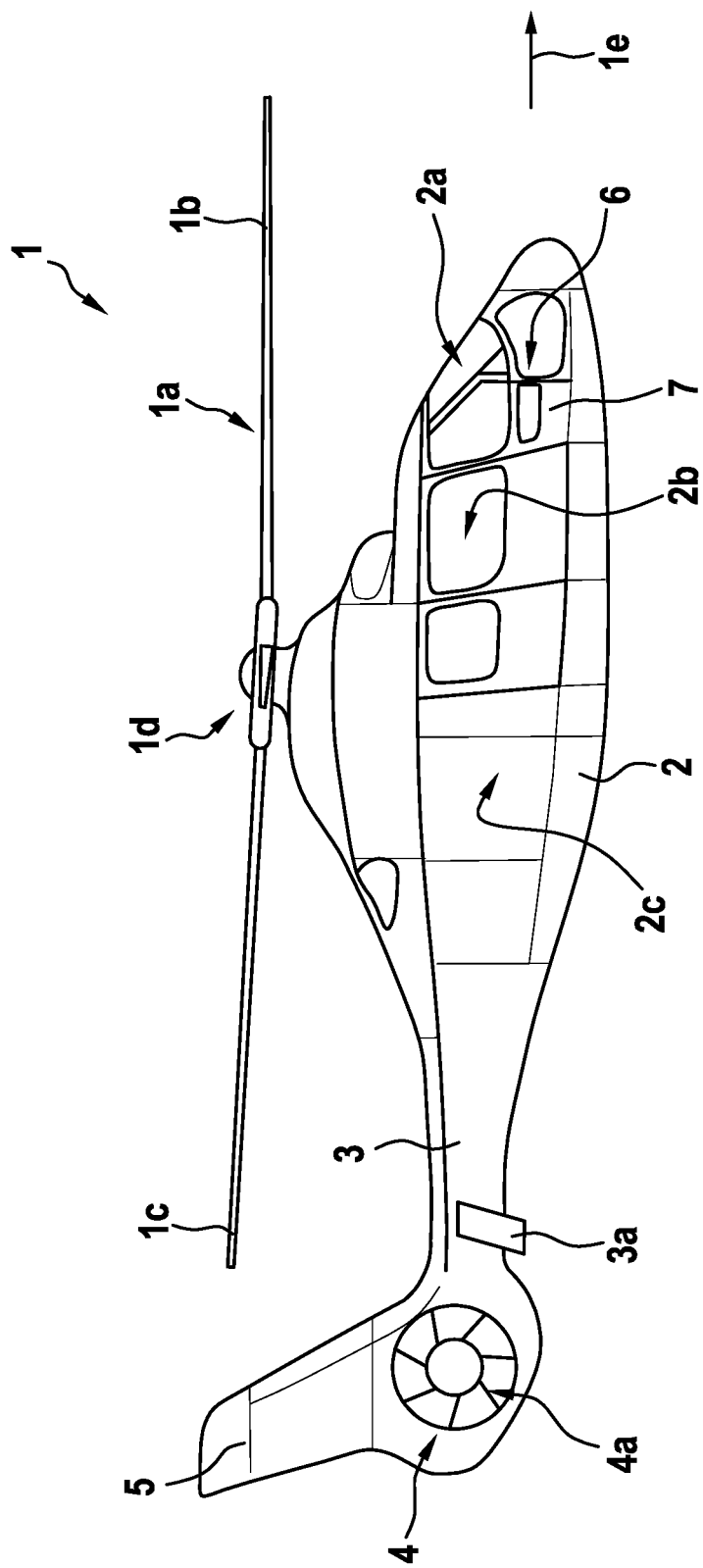
FIG. 1 shows a lateral view of an aircraft with an illustrative aircraft door.

FIG. 1 shows an aircraft 1 that is exemplarily illustrated as a rotorcraft and, more particularly, as a helicopter. Thus, for purposes of simplicity and clarity, the aircraft 1 is hereinafter referred to as the "helicopter 1". The present disclosure is, however, not limited to helicopters and may likewise be applied to any other vehicle.

Illustratively, the helicopter 1 comprises at least one main rotor 1a, preferably a multi-blade main rotor, for providing lift and forward or backward thrust during operation. An arrow 1e illustrates a forward flight direction of the helicopter 1. By way of example, the at least one main rotor 1a comprises a plurality of rotor blades 1b, 1c which are mounted at an associated rotor head 1d to a rotor shaft, which rotates in operation of the helicopter 1 about an associated rotor axis.

Furthermore, the helicopter 1 comprises a fuselage 2 that preferably forms an aircraft interior region 2a, 2b. Illustratively, a right-hand side of the fuselage 2 is shown and, thus, a starboard side wall 2c of the fuselage 2 of the helicopter 1.

The aircraft interior region 2a, 2b may accommodate a cockpit 2a and may further accommodate a cabin 2b for passengers and/or cargo. Illustratively, the aircraft interior region 2a, 2b is accessible via a plurality of access doors 6. For instance, the plurality of access doors 6 comprises a cockpit door 7. However, only the cockpit door 7 is separately labelled whereas other doors of the plurality of access doors 6 are not labelled separately, for simplicity and clarity of the drawing.

By way of example, a tail boom 3 with a horizontal stabilizer 3a is connected to the fuselage 2 of the helicopter 1. The helicopter 1 illustratively further comprises at least one preferentially shrouded counter-torque device 4 configured to provide counter-torque during operation, i.e., to counter the torque created by rotation of the at least one main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5.

Figure 2:
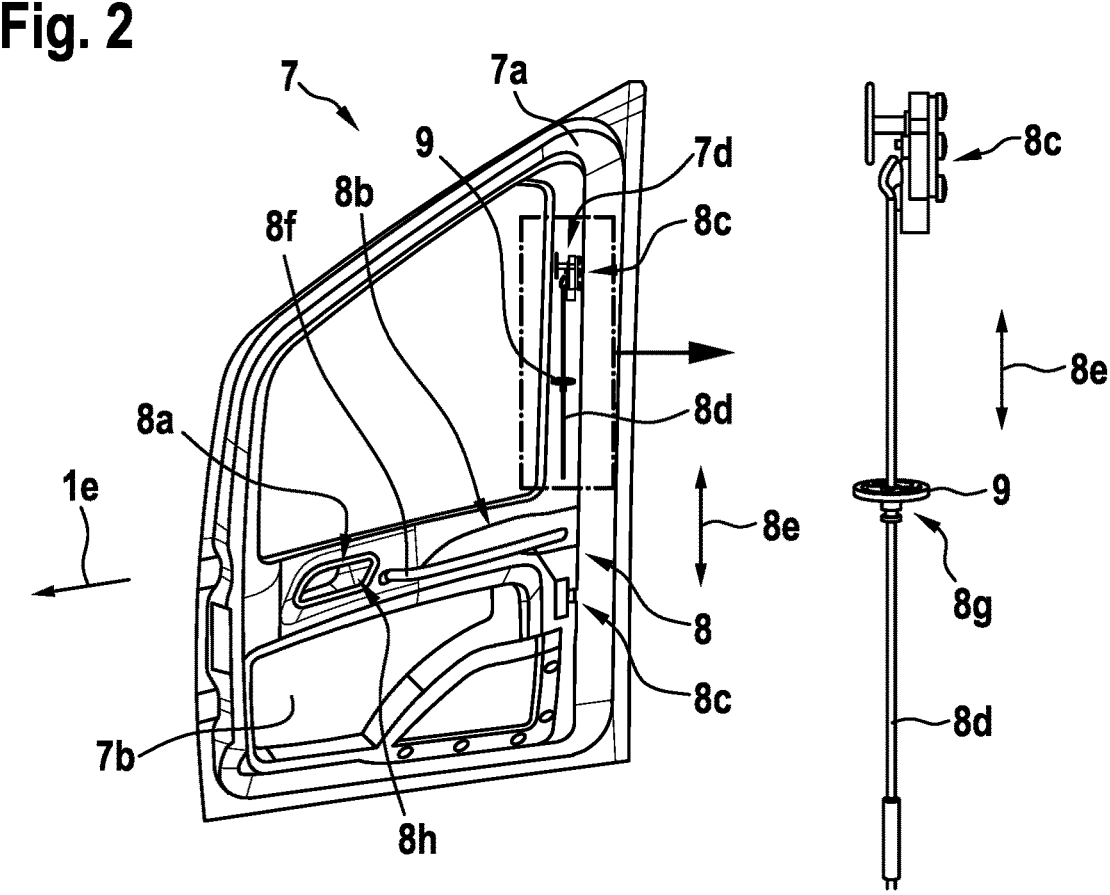
FIG. 2 shows the aircraft door of FIG. 1 with an illustrative door opening system and an anti-vibration device, as well as an enlarged detail view.

FIG. 2 shows the cockpit door 7 of FIG. 1 seen from the aircraft interior region 2a, 2b of the helicopter 1 of FIG. 1. However, it should be noted that the cockpit door 7 is only described in more detail as an example of an aircraft door in general so that the teachings described below are likewise applicable to any aircraft door having the general configuration of the cockpit door 7 as described hereinafter.

Figure 5:
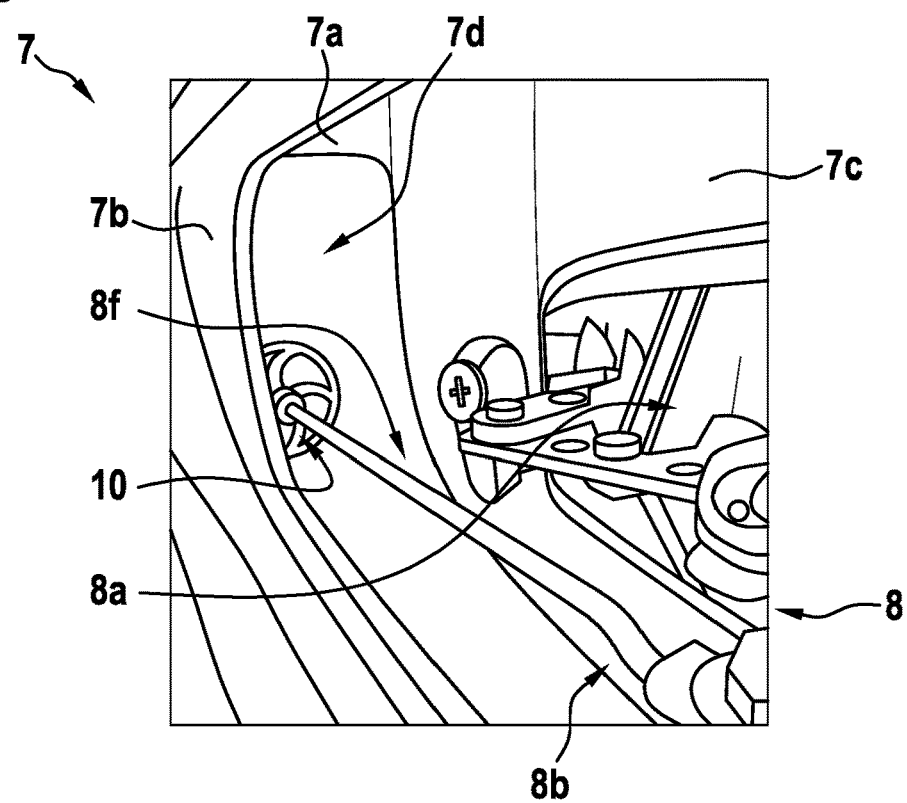
FIG. 5 shows a perspective view of an enlarged detail of the aircraft door of FIG. 2 with the alternative anti-vibration device of FIG. 4.

Illustratively, the cockpit door 7 comprises a frame structure 7a connecting a first door skin 7b with a second door skin (7c in FIG. 5). The first door skin 7b corresponds to an outer door skin that is preferably flush with the starboard side wall 2c of the helicopter 1 of FIG. 1. Therefore, the first door skin 7b is also referred to as "the outer skin 7b" hereinafter, for simplicity and clarity. Accordingly, the second door skin (7c in FIG. 5) is oriented toward the aircraft interior region 2a, 2b of the helicopter 1 of FIG. 1 and, therefore, also referred to as "the inner skin" hereinafter, for simplicity and clarity.

Preferably, the frame structure 7a, the outer skin 7b, and the inner skin (7c in FIG. 5) form an inner door space 7d. A door opening system 8 of the cockpit door 7 is arranged at least partly in the inner door space 7d.

Illustratively, the door opening system 8 comprises at least one and, by way of example, two locking devices 8c for locking the aircraft door 7 in a locked state. The door opening system 8 further comprises actuation kinematics 8b for actuating at least one and, preferably, both locking devices 8c, and at least one transmission rod 8d. The at least one transmission rod 8d preferably couples the actuation kinematics 8b with at least one of the two locking devices 8c.

By way of example, the transmission rod 8d is displaceable in the inner door space 7d, e.g., linearly displaceable, in a displacement direction that corresponds to a length direction 8e of the transmission rod 8d, by means of the actuation kinematics 8b for actuating a first, upper locking device 8c. The length direction 8e is oriented vertically in FIG. 2 and, therefore, the first transmission rod 8d is also referred to hereinafter as "the vertical transmission rod 8d", for simplicity and clarity.

Illustratively, the actuation kinematics 8b are coupled with a door handle 8a via another transmission rod 8f. The door handle 8a may e.g., be operated manually for activating the actuation kinematics 8b via associated door handle kinematics 8h and the other transmission rod 8f. The other transmission rod 8f may be displaceable in the inner door space 7d, e.g., linearly displaceable, in a displacement direction that is at least essentially parallel to the forward flight direction 8e of the helicopter 1 of FIG. 1, for operating the actuation kinematics 8b. The forward flight direction 1e is oriented horizontally in FIG. 2 and, therefore, the other transmission rod 8f is also referred to hereinafter as "the horizontal transmission rod 8f", for simplicity and clarity.

At this point, it should be noted that a suitable door opening system that may be used for implementing the door opening system 8 is well-known to the person skilled in the art. Therefore, a more detailed description of the door opening system 8 is omitted, for brevity and conciseness.

According to the present disclosure, an anti-vibration device 9 is mounted in the inner door space 7d to the vertical transmission rod 8d for absorbing vibrations of the vertical transmission rod 8d. The anti-vibration device 9 is preferably displaceable in the inner door space 7d together with the vertical transmission rod 8d. In other words, the anti-vibration device 9 is rigidly mounted to the vertical transmission rod 8d, but not attached to the frame structure 7a, the outer skin 7b, and/or the inner skin of the cockpit door 7.

Preferably, the anti-vibration device 9 is configured to reduce a degree of freedom in vibrational motion of the vertical transmission rod 8d in the inner door space 7d. Preferentially, the anti-vibration device 9 is configured to modify an associated resonance frequency of the vertical transmission rod 8d.

The anti-vibration device 9 may comprise a predetermined Shore hardness adapted to amortize the associated resonance frequency. Furthermore, the anti-vibration device 9 may comprise an elastomeric material, preferably one of silicone elastomer, rubber elastomer, or polyurethane elastomer. Preferentially, the anti-vibration device 9 is exchangeable.

More specifically, the anti-vibration device 9 is preferably adapted for abutment against the frame structure 7a, the outer skin 7b, and/or the inner skin (7c in FIG. 5) in vibrational motion of the vertical transmission rod 8d. Thus, vibrational motion e.g. parasitic radial movements of the vertical transmission rod 8d may at least be reduced.

FIG. 2 further illustrates an enlarged detail of a portion of the vertical transmission rod 8d which is linearly displaceable in a displacement direction that corresponds to the length direction 8e of the vertical transmission rod 8d for actuating the upper locking device 8c. As described above, the vertical transmission rod 8d is provided with the anti-vibration device 9 which is preferably attached to the vertical transmission rod 8d at a predetermined longitudinal position 8g dependent on an intended resonance frequency of the vertical transmission rod 8d.

Figure 3:
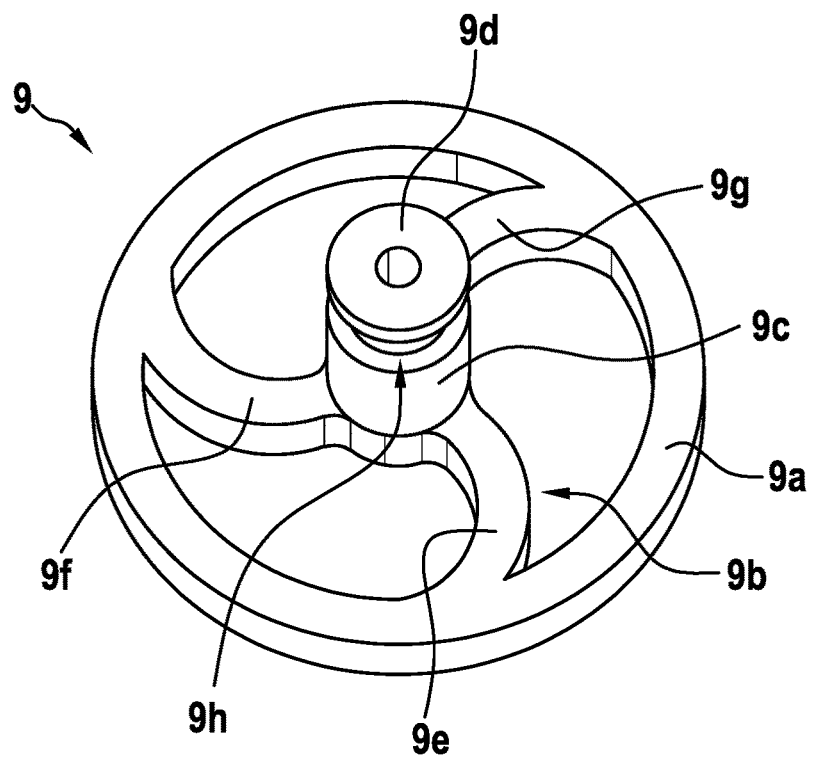
FIG. 3 shows a perspective view of the anti-vibration device of FIG. 2.

FIG. 3 shows the anti-vibration device 9 of FIG. 2. Illustratively, the anti-vibration device 9 comprises an outer ring 9a and an inner ring 9c. The inner ring 9c is preferably provided for being rigidly attached to the vertical transmission rod 8d of FIG. 2. Preferentially, the outer ring 9a and the inner ring 9c are coaxially arranged.

More specifically, the outer ring 9a is preferably connected to the inner ring 9c via a curved link 9b. By way of example, the curved link 9b comprises three curved connecting arms 9e, 9f, 9g connecting the outer ring 9a with the inner ring 9c. However, the curved link 9b may also comprise more than the three curved connecting arms 9e, 9f, 9g, as explained by way of example below at FIG. 4. Preferably, at least the curved link 9b is elastically deformable.

Illustratively, the anti-vibration device 9 further comprises a mounting interface 9d, which may comprise a bushing. The mounting interface 9d may be rigidly attached to, or integrally formed with, the inner ring 9c.

Preferably, the mounting interface 9d is provided for being rigidly attached to the vertical transmission rod 8d of FIG. 2. Therefore, the mounting interface 9d and/or the inner ring 9c is provided with a fixation groove 9h adapted to permit attachment of the anti-vibration device 9 to the vertical transmission rod 8d of FIG. 2. More particularly, as explained above at FIG. 2 the mounting interface 9d is preferentially rigidly attached to the vertical transmission rod 8d of FIG. 2 at the predetermined longitudinal position 8g of FIG. 2 dependent on an intended resonance frequency of the vertical transmission rod 8d.

Figure 4:
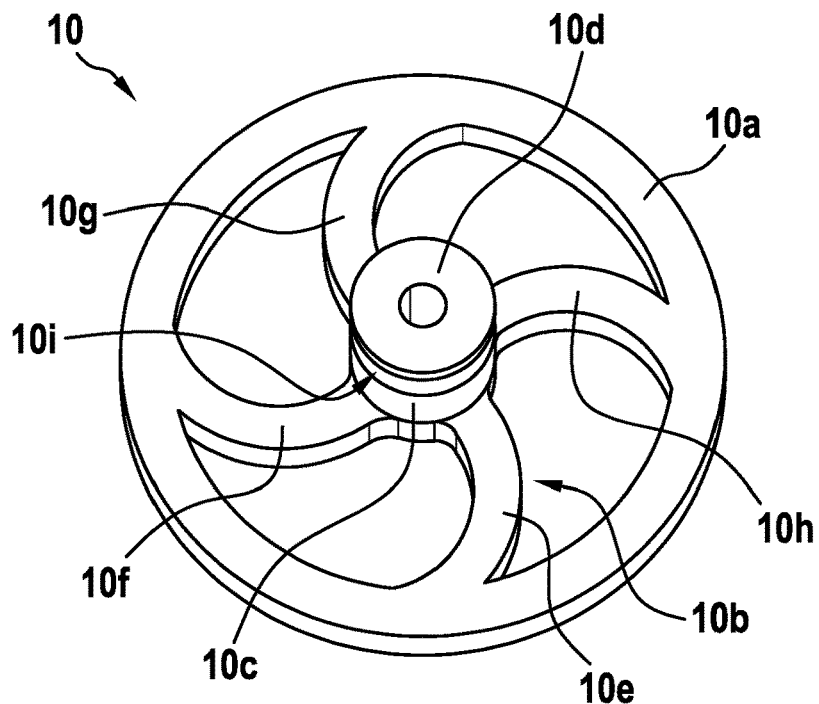
FIG. 4 shows a perspective view of an alternative anti-vibration device.

FIG. 4 shows an anti-vibration device 10 according to a variant, which may be used instead of the anti-vibration device 9 of FIG. 2 and FIG. 3. Illustratively, the anti-vibration device 10 comprises an outer ring 10a and an inner ring 10c. Preferentially, the outer ring 10a and the inner ring 10c are coaxially arranged.

More specifically, the outer ring 10a is preferably connected to the inner ring 10c via a curved link 10b. In contrast to the curved link 9b of FIG. 3, the curved link 10b now illustratively comprises four curved connecting arms 10e, 10f, 10g, 10h connecting the outer ring 10a with the inner ring 10c. However, the curved link 10b may also comprise more than the four curved connecting arms 10e, 10f, 10g, 10h. Preferably, at least the curved link 10b is elastically deformable.

Illustratively, the anti-vibration device 10 further comprises a mounting interface 10d, which may comprise a bushing. The mounting interface 10d may be rigidly attached to, or integrally formed with, the inner ring 10c. Preferably, the mounting interface 10d and/or the inner ring 10c is provided with a fixation groove 10i.

FIG. 5 shows a cut-out of the cockpit door 7 of FIG. 2 with the frame structure 7a connecting the outer skin 7b with an inner skin 7c, thereby forming the inner door space 7d. The cockpit door 7 is equipped with the door opening system 8 that is arranged at least partly in the inner door space 7d. The door opening system 8 comprises the door handle 8a which is connected via the door handle kinematics 8h to the horizontal transmission rod 8f.

By way of example and in contrast, or complementary, to FIG. 2, the anti-vibration device 10 is now mounted in the inner door space 7d to the horizontal transmission rod 8f for absorbing vibrations of the horizontal transmission rod 8f. The anti-vibration device 10 is preferably displaceable in the inner door space 7d together with the horizontal transmission rod 8f. In other words, the anti-vibration device 10 is rigidly mounted to the horizontal transmission rod 8f, but not attached to the frame structure 7a, the outer skin 7b, and/or the inner skin of the cockpit door 7.

It should be noted that modifications to the above described embodiments are within the common knowledge of the person skilled in the art and, thus, also considered as being part of the present disclosure. It should further be noted that the drawings are only intended for schematically representing embodiments of the present disclosure and not for showing detailed constructions thereof. For instance, according to FIG. 2 the vertical transmission rod 8d is provided with the anti-vibration device 9 according to FIG. 3, and according to FIG. 5 the horizontal transmission rod 8f is provided with the anti-vibration device 10 according to FIG. 4. However, the vertical transmission rod 8d may instead be provided with the anti-vibration device 10 according to FIG. 4, and the horizontal transmission rod 8f may instead be provided with the anti-vibration device 9 according to FIG. 3. Furthermore, each one of the transmission rods 8d, 8f may be provided with two or more anti-vibration devices.

In any case, provision of the anti-vibration devices 9, 10 enables use of a low number of parts for anti-vibration measures and an easy installation if a correction, such as vibration adjustment, is needed/requested. It may be sold/assembled only on demand depending on respective aircraft properties, as each aircraft has a different range of frequencies. Moreover, there is no pollution inside the door opening system 8 due to the material chosen and the anti-vibration devices 9, 10 form a mobile system integrated on the transmission rods 8d, 8f with no limitation of stroke as well as less weight inertia of the overall system. Finally, specific colors may be used to indicate currently used qualities or ranges of absorption for differentiating anti-vibration devices, e.g., Red 80 shore, Yellow 90 shore, Green 100 shore, and so on.

REFERENCE LIST 1 rotorcraft
1a multi-blade main rotor
1b, 1c rotor blades
1d rotor head
1e rotorcraft forward flight direction
2 fuselage
2a cockpit
2b cabin
2c starboard side wall
3 tail boom
4 counter-torque device
4a tail rotor
5 fin
6 access doors
7 cockpit door
7a frame structure
7b outer skin
7c inner skin
7d inner space
8 door opening system
8a door handle
8b opening system kinematics
8c locking devices
8d vertical transmission rod
8e transmission rod length direction
8f horizontal transmission rod
8g predetermined longitudinal position
8h door handle kinematics
9 anti-vibration device
9a outer stop ring
9b curved link
9c inner mounting ring
9d mounting interface
9e, 9f, 9g connecting arms
9h fixation groove
10 anti-vibration device
10a outer stop ring
10b curved link
10c inner mounting ring
10d mounting interface
10e, 10f, 10g, 10h connecting arms
10i fixation groove

The invention claimed is:

1. An aircraft door comprising:
a frame structure connecting a first door skin with a second door skin, wherein the frame structure, the first door skin, and the second door skin form an inner door space;
a door opening system arranged at least partly in the inner door space, comprising:
at least one locking device for locking the aircraft door in a locked state,
actuation kinematics for actuating the at least one locking device,
at least one transmission rod coupling the actuation kinematics with the at least one locking device; wherein the at least one transmission rod is displaceable in the inner door space by means of the actuation kinematics for actuating the at least one locking device; and
an anti-vibration device mounted in the inner door space to the at least one transmission rod for absorbing vibrations of the at least one transmission rod, wherein the anti-vibration device is displaceable in the inner door space together with the at least one transmission rod;
wherein the anti-vibration device comprises an outer ring and an inner ring,
wherein the outer ring is connected to the inner ring via a curved link, and
wherein the inner ring is rigidly attached to the at least one transmission rod.

2. The aircraft door of claim 1, wherein the anti-vibration device is configured to reduce a degree of freedom in vibrational motion of the at least one transmission rod in the inner door space.

3. The aircraft door of claim 1, wherein the anti-vibration device is configured to modify an associated resonance frequency of the at least one transmission rod.

4. The aircraft door of claim 3, wherein the anti-vibration device comprises a predetermined Shore hardness adapted to amortize the associated resonance frequency.

5. The aircraft door of claim 1, wherein the anti-vibration device comprises an elastomeric material, preferably one of silicone elastomer, rubber elastomer, or polyurethane elastomer.

6. The aircraft door of claim 1, wherein the curved link comprises at least three curved connecting arms connecting the outer ring with the inner ring.

7. The aircraft door of claim 1,
wherein the outer ring is adapted for abutment against the frame structure, the first door skin, and/or the second door skin in vibrational motion of the at least one transmission rod at least for reducing the vibrational motion.

8. The aircraft door of claim 1, wherein the curved link is elastically deformable.

9. The aircraft door of claim 1,
wherein the anti-vibration device further comprises a mounting interface, and
wherein the mounting interface is rigidly attached to the at least one transmission rod.

10. The aircraft door of claim 9, wherein the mounting interface is rigidly attached to the at least one transmission rod at a predetermined longitudinal position dependent on an intended resonance frequency of the at least one transmission rod.

11. The aircraft door of claim 9, wherein the mounting interface comprises a bushing.

12. The aircraft door of claim 9, wherein the inner ring is rigidly attached to, or integrally formed with, the mounting interface.

13. The aircraft door of claim 9, wherein the anti-vibration device is exchangeable.

14. An aircraft with an aircraft door according to claim 1.

15. An aircraft door comprising:
a frame structure connecting a first door skin with a second door skin, wherein the frame structure, the first door skin, and the second door skin cooperate to form an inner door space;
a door opening system arranged at least partly in the inner door space, the door opening system comprising:
a locking system for locking the aircraft door in a locked state,
actuation kinematics for actuating the lock,
a transmission rod coupling the actuation kinematics with the locking device; wherein the transmission rod is displaceable in the inner door space by the actuation kinematics for actuating the lock; and
an anti-vibration device mounted in the inner door space to the transmission rod for absorbing vibrations of the transmission rod, wherein the anti-vibration device is displaceable in the inner door space together with the transmission rod;
wherein the anti-vibration device comprises a first member spaced radially outwardly from an inner member,
wherein the first member is connected to the inner member, and
wherein the inner member is attached to the transmission rod.

16. The aircraft door of claim 15,
wherein the anti-vibration is rigidly attached to the transmission rod.

17. The aircraft door f claim 15,
wherein the first member comprises an outer ring and the inner member comprises an inner ring, and
wherein the inner ring is rigidly attached to the transmission rod.

18. An aircraft door comprising:
a frame structure connecting a first door skin to a second door skin to form an inner door space;
a door opening system arranged at least partly in the inner door space, the door opening system comprising:
a locking device for locking the aircraft door in a locked state,
actuation kinematics for actuating the locking device, and
a rod coupling the actuation kinematics to the locking device; wherein the rod is displaceable in the inner door space by the actuation kinematics for actuating the locking device; and
an anti-vibration device mounted connected with the rod and disposed in the inner door space to the rod for absorbing vibrations of the transmission rod, wherein the anti-vibration device is displaceable in the inner door space together with the rod, wherein the anti-vibration device comprises a first member spaced radially outwardly from an inner member,
wherein the first member is connected to the inner member, and
wherein the inner member is attached to the transmission rod.

* * * * *